United States Patent [19]

Sullivan et al.

[11] 4,253,528

[45] Mar. 3, 1981

[54] PIVOTING DUAL LAND WHEEL FOR A PLOW

[75] Inventors: James F. Sullivan, East Moline; Loren G. Arnold, Rock Island, both of Ill.

[73] Assignee: Deere & Company, Moline, Ill.

[21] Appl. No.: 964,244

[22] Filed: Nov. 27, 1978

[51] Int. Cl.² ............................................. A01B 15/14
[52] U.S. Cl. .................................... 172/386; 172/400; 172/421
[58] Field of Search ............... 280/11.19, 11.28, 43.17, 280/43.23, 111, 112 R, 112 A, 85, 117; 172/400, 401, 386, 383, 421, 413

[56] References Cited

U.S. PATENT DOCUMENTS

| 1,213,454 | 1/1917 | Brown | 280/87.04 A |
|---|---|---|---|
| 2,399,043 | 4/1946 | Klumb | 280/85 |
| 2,994,546 | 8/1961 | Cooper | 280/111 |
| 3,065,803 | 11/1962 | Pierson | 280/43.23 X |
| 3,497,231 | 2/1970 | Fulmer et al. | 280/111 X |
| 3,731,749 | 5/1973 | Sullivan et al. | 280/43.23 X |
| 4,043,403 | 8/1977 | Anderson et al. | 280/43.23 X |

Primary Examiner—John J. Love
Assistant Examiner—Michael Mar

[57] ABSTRACT

A land wheel assembly including dual wheels pivotally mounted on a vertically positionable arm of an implement such as a plow. When the arm is lowered and the plow is in the transport position the wheels can rock in a castering fashion about a pivotal axis having a substantial vertical component so that as the implement is turned around a corner, the wheels caster to reduce tire scuffing and stresses in the assembly. When the arm is raised to lower the implement to the ground-working position, the pivotal axis shifts, approaching a generally horizontal attitude and allowing the wheels to pivot up and down with respect to each other about the axis to provide an even plowing depth and reduce stresses throughout the assembly on uneven ground.

13 Claims, 7 Drawing Figures

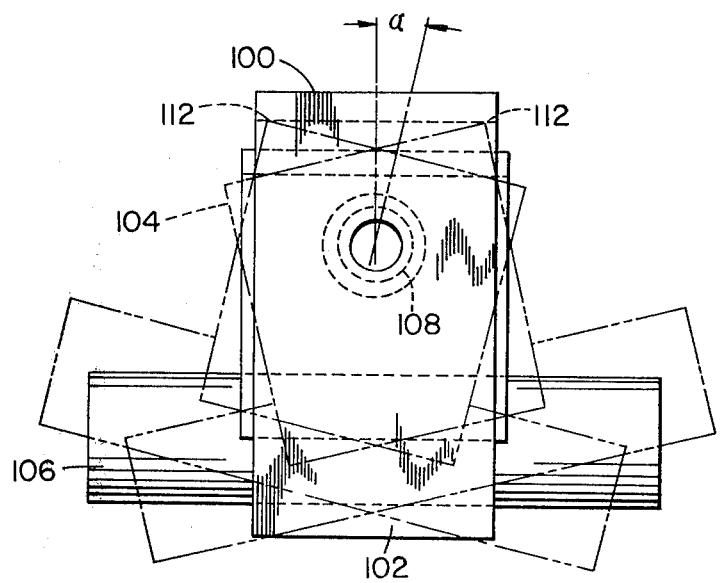
FIG. 6
FIG. 7
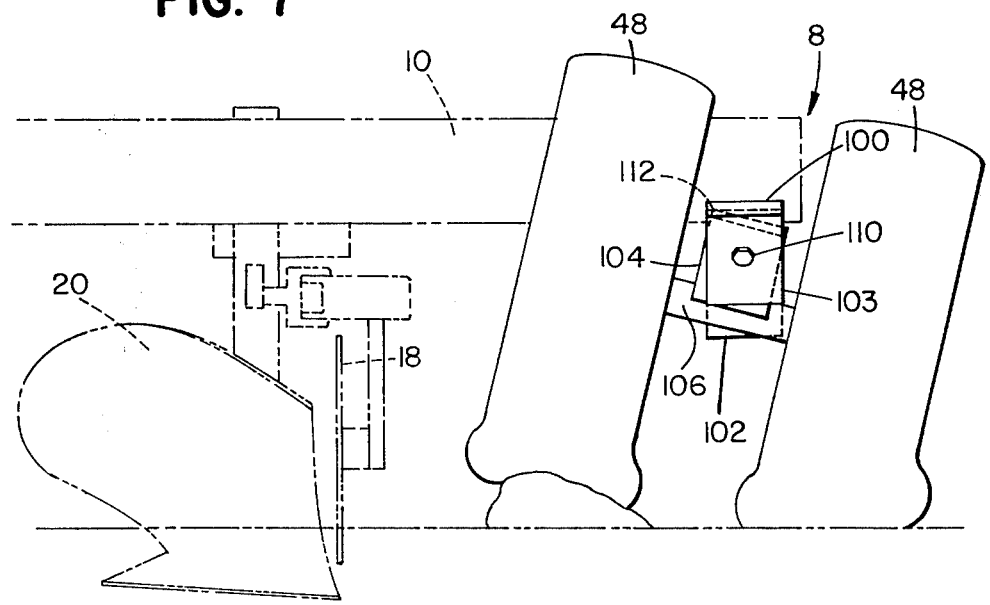

PIVOTING DUAL LAND WHEEL FOR A PLOW

BACKGROUND OF THE INVENTION

The present invention relates generally to a ground-working implement, and more specifically to a pivoting land wheel for such an implement.

In the following specification and in the drawings, the ground-working implement will be described and illustrated as a drawn moldboard plow, but those skilled in the art will recognize the pivoting land wheel of the present invention can also be used with other implements.

A typical drawn or towed plow is supported on front and rear furrow wheels and on a land wheel located forwardly of the rear furrow wheel. The plowing depth is controlled by adjusting the land wheel and the front furrow wheel. The plow is raised to a transport position by lowering the wheels. An example of such a plow is shown in U.S. Pat. No. 3,731,749.

Dual land wheels have been used to increase flotation on plowed ground and to add weight to the plow for stability. However, tire scuffing during turns has been severe especially when a rigid rear furrow wheel is used with the dual land wheels. When the plow is turned sharply in the transport postion, the land wheels will slide sideways, putting considerable stress on the entire land wheel assembly.

In addition, when dual land wheels are used for gauging the plowing depth, uneven ground adversely affects the depth since both the land wheels will tend to raise to the level of the highest obstacle or unevenness encountered by either of the wheels. Uneven ground also causes stresses throughout the wheel assembly. A land wheel assembly is required that will allow the dual wheels to pivot up and down sufficiently to provide even plowing depth and eliminate stresses in the assembly over uneven ground, and also will allow the wheels to turn in a castering fashion to avoid scuffing and stresses as the plow is turned while in the transport position.

SUMMARY OF THE INVENTION

It is therefore an object of this invention to provide a dual land wheel assembly for a plow which reduces stresses and tire scuffing during turns, and which reduces depth variations while plowing on uneven ground.

It is a further object of this invention to provide a dual land wheel assembly with a pivoting dual wheel axle that allows the land wheels to caster when the plow is in the transport position and to pivot up and down with respect to each other when the plow is in the plowing position.

It is a further object to provide a land wheel assembly having dual wheels which are rockable about a pivotal axis, the axis having a substantial vertical component when the plow is in the transport position to allow the wheels to turn in a castering fashion and having a substantial horizontal component when the plow is in the plowing postion to allow the wheels to move up and down on uneven ground.

BRIEF DESCRIPTION OF THE DRAWINGS

In the drawings:

FIG. 6 is a front view of the pivoting bracket illustrating the built-in stops;

FIG. 7 is a front view of the land wheels pivoting while encountering uneven ground in the plowing position.

DESCRIPTION OF THE PREFERRED EMBODIMENT

Figure 1:
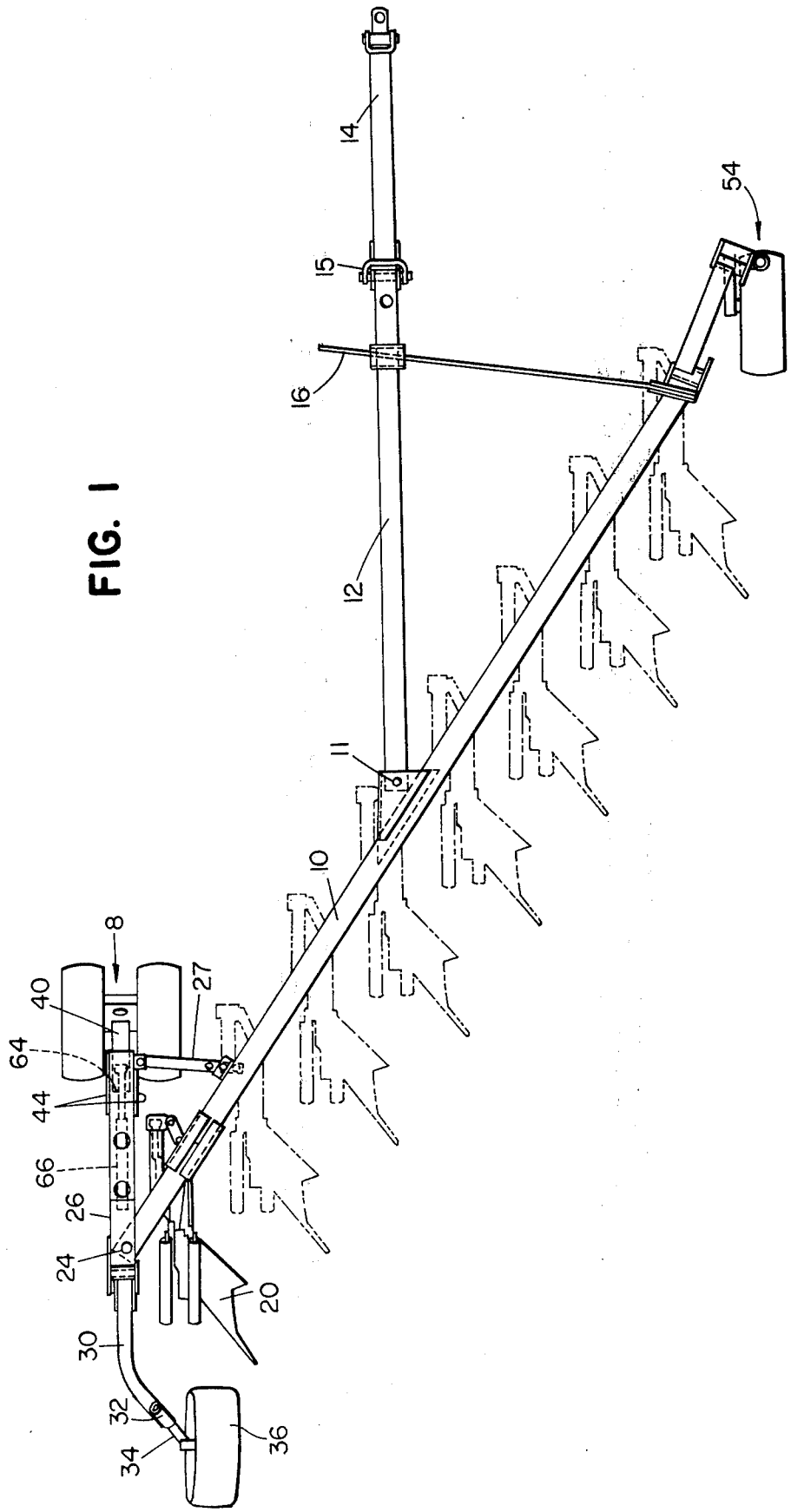
FIG. 1 is a top view of a plow constructed in accordance with the present invention.

Referring to the drawings, a plow is shown which includes the pivoting land wheel assembly 8 of the present invention. The plow includes a frame assembly having a main frame 10 extending obliquely to the direction of movement of the plow. Pivotally connected to the frame 10 by a pin 11 is a hitch tube 12. A drawbar 14 that forms part of the hitch is pivotally connected to the hitch tube 12 by a generally horizontal pin 15. The forward part of the hitch tube is laterally supported by a bar 16 extending between the frame 10 and the tube. The frame mounts a plurality of coulters 18 and a plurality of conventional plow bottoms 20. Alternatively, the frame could carry similar earthworking tools having leading edges or points for penetrating the ground as the frame is lowered.

A pin 24 connects a generally horizontal fore-and-aft hollow beam or wheel frame 26 to the rear of the main frame 10 to rock with the latter about its axis. A bar 27 secures the forward end of the beam 26 with respect to the frame 10.

Connected for rocking about a generally horizontal pivot or pin 28 is a furrow wheel arm 30 which carries a bearing 32. A shaft 34 mounted in the bearing 32 carries a conventional rear furrow wheel 36. As best seen in FIG. 1, the arm 30 is angled inwardly so that the wheel 36 trails the rear plow bottom 20.

The land wheel assembly 8 includes an arm 40 rockably connected to the beam 26 by a generally horizontal pivot 42 which in turn is connected between brackets 44 welded or otherwise secured on either side of and near the forward end of the beam 26. A pair of ground or gauge wheels 48 are carried by a dual wheel axle 50 supported for limited pivoting about a downwardly and forwardly inclined axis 52 on the end of the arm 40, as discussed in detail below.

Connected towards the front of the frame 10 is a conventional front furrow wheel assembly 54. A hydraulic cylinder raises and lowers the forward end of the frame with respect to the furrow wheel.

The land wheel arm 40 is welded or otherwise secured to a bushing or sleeve assembly 56 mounted for rocking about the pivot 42. Also secured to the bushing assembly 56 in parallel spaced apart relation are a pair of plates 58. A contact bar 60 extends between and is welded to the plates. The bushing assembly 56, plates 58, bar 60 and land wheel arm 40 form a single rigid arm member. A control arm or reciprocating plate member 62 is connected for freely rocking about the bushing assembly 56 between the plates 58 and includes a contact face 63 which abuts against the contact bar 60 as plate 62 is rotated in the clockwise direction from the position shown in FIG. 5.

An opening 64 is provided in the bottom wall of the beam 26, and the plates 58 and 62 extend upwardly through the opening. A double-acting hydraulic cylinder 66 is anchored within the beam 26 by a bracket 68. A pin passes through the bifurcated end of the cylinder rod and through a hole 70 near the upper end of the arm 62 to operably connect the cylinder with the arm. Pinned to the arm 62 through a hole 72 located radially inwardly from the hole 70 is one end of a rod assembly 74 including a clevis 76 internally threaded for receiving the threaded end of a rod 78. A portion of the pin and clevis 76 and the arm 62 are centrally confined with respect to the bushing assembly 56 (FIG. 4) by the plates 58 which also prevent the pin from slipping out of the clevis and hole 72. A jam nut 80 threaded over the rod 78 is tightened against the clevis 76 to secure the rod against rotation. The opposite end of the rod assembly 74 extends through and is held by a rear lock nut within a pin or trunnion 82 pivotally connected to a rock arm 84 which is preferably in the form of parallel plates welded on either side of the furrow wheel arm 30 for rocking therewith about the pivot 28.

Figure 4:
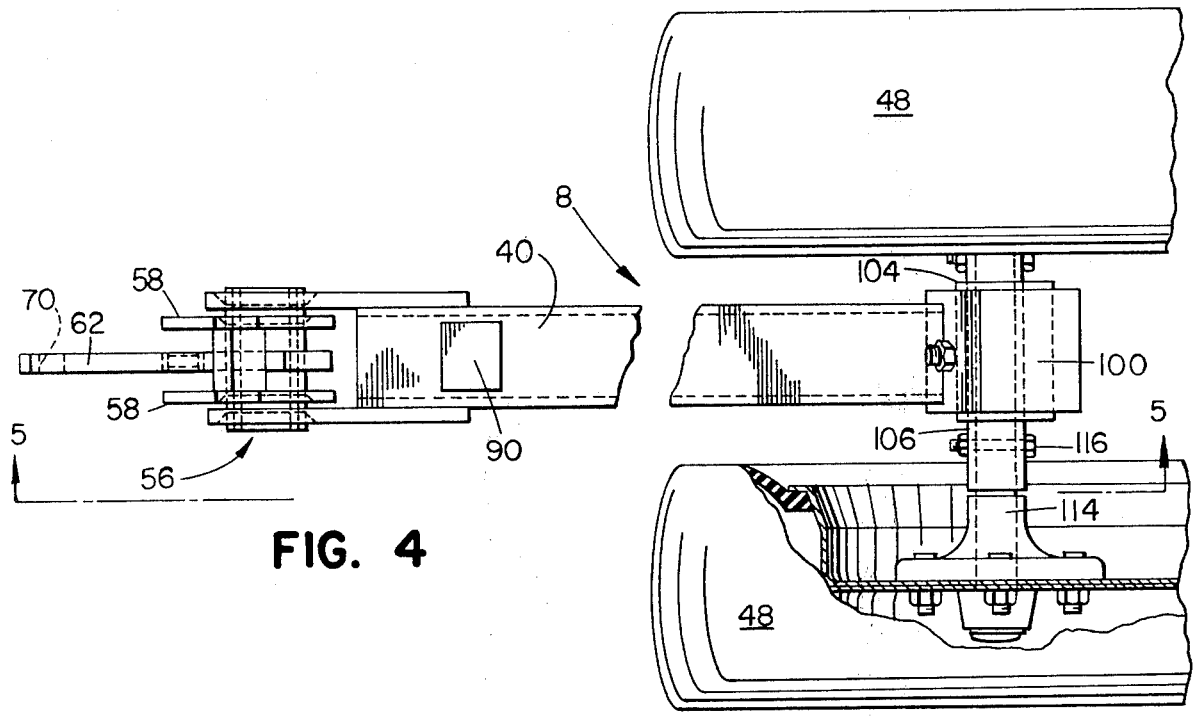
FIG. 4 is an enlarged top view of the land wheel assembly.

When the cylinder 66 is extended, the control arm 62 is pivoted against the forward face of the bar 60 and rocks the plates 58 and the arm 40 in the clockwise direction, lowering the ground wheels 48 until the cylinder is fully extended. Movement of the control arm 62 in the clockwise direction also shifts the rod assembly 74 forwardly, pivoting the rock arm 84 and the furrow wheel arm 30 in the counterclockwise direction to lower the furrow wheel 36, lifting the beam 26 and the frame 10. The linkage moment arm lengths are designed to rotate the arm 40 about the pivot 42 at a greater rate than the furrow wheel arm 30 is rotated about the pivot 28. The land wheels 48, therefore, are raised and lowered at a greater rate than the rear furrow wheel 36. As best seen in FIGS. 1 and 4, the moving elements of the lift linkage including the arm 40, the plates 58, the arm 62, the rod assembly 74, the rock arm 84, and the cylinder 66, as well as the pivotal axis 52, are located directly in line with each other to eliminate bending moments.

Retracting the hydraulic cylinder 66 rotates the control arm 62 in the counterclockwise direction and the weight of the plow on the land wheel assembly 8 biases the arm 40 and the plates 58 in the counterclockwise direction so that the bar 60 remains abutted against the contact portion 63 until the ground wheels 48 reach the plowing position. In the plowing position, the arm 40 approaches a horizontal position, and the axis 52, which is inclined slightly downwardly from the axis of the arm to provide directional stability for the land wheels 48, has a substantial horizontal component so the wheels can pivot up and down. As the control arm 62 moves in the counterclockwise direction, it shifts the rod assembly 74 rearwardly, allowing the rock arm 84 and the furrow wheel arm 30 to pivot in the clockwise direction to permit the furrow wheel 36 to raise but at a slower rate than the ground wheels 48 are raised because of the linkage arm lengths. Since the ground wheels 48 are raised more quickly than the furrow wheel 36, the front of the beam 26 tilts downwardly below the rear of the beam, causing the main frame 10 to roll or tilt in the clockwise direction toward the ground (FIG. 1). The plow shares 20 roll with the frame so the share points are tilted downwardly to contact and enter the ground before a larger portion of the plow shares contact the soil. The pivotal connection between the hitch tube and the drawbar 14 allows the forward end of the tube to drop as the frame 10 rolls in the direction of the arrow.

Figure 3:
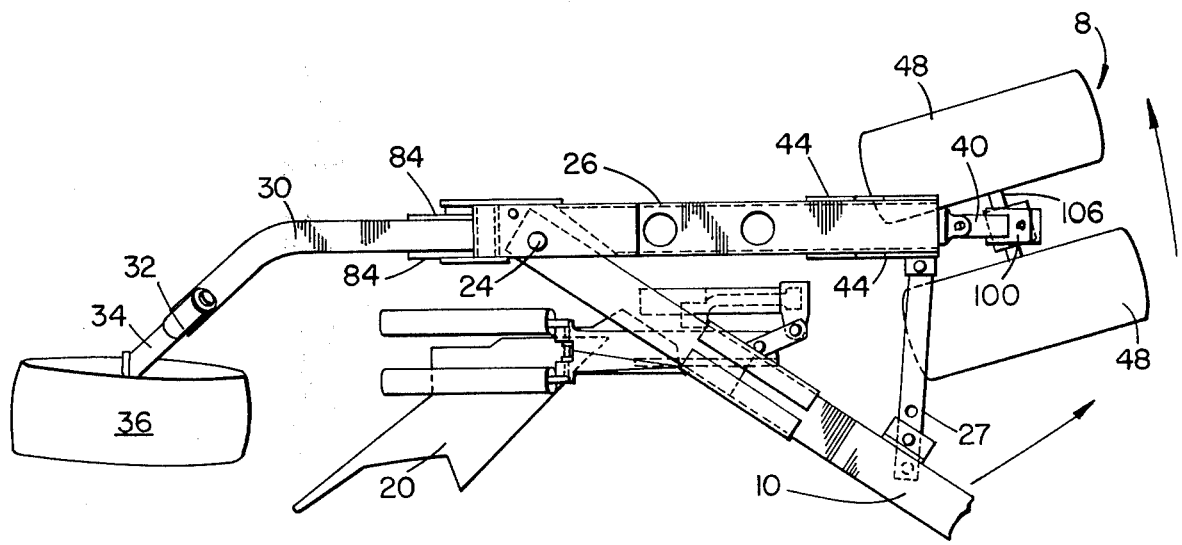
FIG. 3 is a top view of the rear of the plow shown in FIG. 2 with the ground wheels pivoted in a castering fashion during a left turn.
Figure 5:
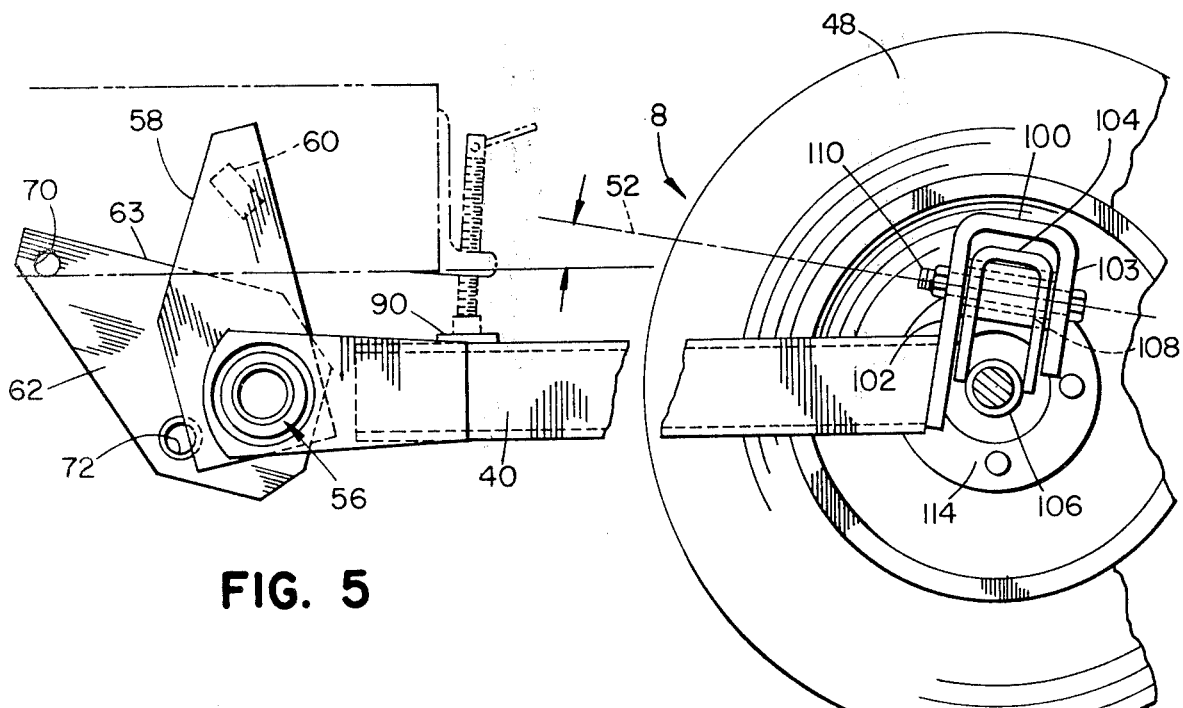
FIG. 5 is an enlarged side view of the assembly shown in FIG. 4.

An adjustable depth stop 88 is secured to the frame for contacting a plate 90 on the arm 40 to limit the counterclockwise movement of the arm for adjusting the plowing depth. The stop 88 preferably includes a stud 92 threaded through a hole in a support 94 bolted to the forward end of beam 26. A bent pin 96 is provided for turning the stud 92 to the adjusted position. When the plate 90 on the arm 40 contacts the stop 88 (FIG. 3), the arm and the plates 58 stop rocking about the pivot 42. With all depth stop settings except the maximum, the arm 40 contacts the stop 88 before the rear furrow wheel 36 has reached its operating or plowing position. Continued retraction of the cylinder 66 causes the control arm 62, since it is free to pivot about the sleeve 56, to rotate in the counterclockwise direction away from the bar 60. The rod assembly 74 moves rearwardly, and the furrow wheel 36 rises to the final plowing position (FIG. 5). Simultaneously, the beam 26 returns to a generally horizontal attitude as the furrow wheel 36 enters the furrow, and the frame 10 rolls back to its normal plowing position so the share points 22 are no longer tilted downwardly. The depth of the furrow wheel can be adjusted by loosening the jam nut 80 on the rod assembly 74 and turning the threaded rod 78 to extend or retract with respect to the internally threaded clevis 76.

Figure 2:
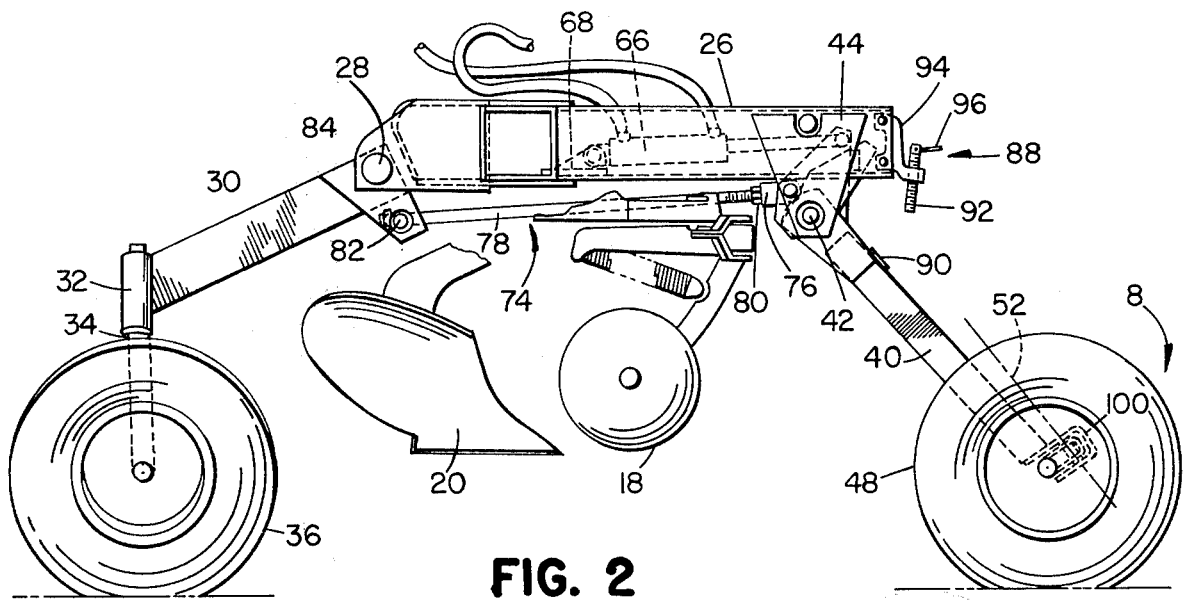
FIG. 2 is a side view of the rear of the plow in FIG. 1 with the ground and furrow wheels lowered so the plow is in the raised position.

To lift the plow from the ground-working position, fluid under pressure is supplied to the cylinder 66, extending the cylinder rod and rotating the control arm 62 in the clockwise direction about the pivot 42. The rod assembly 74 is moved forwardly by the control arm 62, rotating the furrow wheel arm 30 in the counterclockwise direction to raise the rear end of the plow. As the control arm 62 contacts the bar 60, the plates 58 begin to rotate with the control arm about the pivot 42, thus lowering the arm 40 and the ground wheels 48 with the furrow wheel 36 to aid in lifting the plow to the raised position. The cylinder 66 can be fully extended, at which time both the furrow wheel 36 and the ground wheels 48 are in the final transport position (FIG. 2). As the cylinder is extended, the axis 52 shifts with the arm 40 from a substantially horizontal attitude to a substantially vertical attitude.

To lower the plow into the ground, the front furrow wheel 54 is raised so the forward plow bottoms 20 begin to penetrate the soil as the plow moves forwardly. The hydraulic cylinder 66 is retracted, rotating the control arm 62 and allowing the arm 40 and ground wheels 48 to raise with respect to the frame under the weight of the plow. Simultaneously the arms 84 and 30 allowed to rock as the rod assembly 74 moves rearwardly, and the furrow wheel 36 rises at a slower rate than the ground wheels 48 to tilt the beam 26 towards the ground wheels. The main frame 10 rolls slightly about its longitudinal axis to angle the share points 22 towards the ground. The stop 88 prevents further rotation of the arm 40 and the plates 58 when the wheels 48 have reached the preselected plowing position. If the depth stop 88 is set for plowing at less than the maximum depth (FIG. 5), the furrow wheel 36 continues to raise as the control arm 62 pivots away from the bar 60 between the arm 58 until the cylinder 66 is completely retracted. If the depth stop 88 is adjusted for maximum plowing depth, both the ground and the rear furrow wheels reach their plowing positions at approximately the same time.

As best seen in FIGS. 4 and 5, the pivoting land wheel assembly 8 of the present invention includes an inverted U-shaped bracket 100 having an extended rear leg portion 102 welded to the end of the arm 40 and a forward leg 103. A mating U-shaped spindle bracket 104 carrying a spindle support tube 106 welded thereto is pivotally connected within the bracket 100 by a bushing 108 secured between the legs 102 and 103 by a pin or bolt 110. The bolt 110 passes through holes in the legs 102 and 103 and positions the bushing 108 so the spindle bracket 104 can rock about the axis 52 a limited amount before contacting the top of the U-shaped bracket 100 at the points 112 (FIG. 6). The angle α that the bracket 104 can rock about the axis 52 can vary somewhat but is preferably about 12°.

The dual wheel axle which carries the wheels 48 includes identical spindle and hub assemblies 114 inserted in opposite ends of the spindle support tube 106 and secured therein by hex bolts 116.

When the arm 40 is raised (FIG. 5) and the plow is in the working position, the axis 52 approaches a horizontal attitude but retains a leading slant, preferably about 10°, downwardly from the horizontal. The wheels tend to move generally up and down with respect to each other over uneven ground (FIG. 7) as the spindle bracket rocks about the axis 52. The slight leading slant of the axis 52 downwardly from the horizontal, as best seen in FIG. 5, provides directional stability for the wheels so they will not pivot unnecessarily. Since the axis 52 has a substantial horizontal component, the wheels 48 can pivot up and down sufficiently to provide an even plowing depth over uneven ground.

When the cylinder 66 is extended to lower the arms 30 and 40 and raise the plow frame, the axis 52 of the spindle bracket pivot shifts from the attitude shown in FIG. 5 to that shown in FIG. 2 with a substantial vertical component. The dual wheels 48 tend to pivot about the axis in castering fashion as the tractor and plow are turned around a corner (FIG. 3) to reduce or eliminate tire scuffing and reduce stresses on the land wheel and lift assembly. The wheels 48 can also move up and down a limited amount with respect to each other when the arm 40 is in the transport position since the axis 52 retains a horizontal component. This limited relative vertical movement helps reduce impact loading on the assembly when transporting the plow over rough surfaces.

The top of the spindle bracket 104 contacts the U-shaped bracket 100 at one of the points 112 (FIG. 4) to limit the pivoting between the spindle bracket and the arm 40 so excessive side forces do not cause the wheels to roll on their sides during short radius turns. The built-in stops also prevent excessive pivoting when uneven forces are applied to the wheels 48, for example during backing of the plow.

The axis 52 of the pivot is essentially centered with respect to the arm 40 (FIG. 4) so that there is little or no torque transmitted through the arm during normal operating conditions, even when uneven ground (FIG. 7) is encountered during plowing. Since the axis 52, the lift linkage for the arms 30 and 40, and the cylinder 66 all essentially lie along a fore-and-aft vertical plane, bending moments within the system are virtually eliminated. The land wheel assembly is relatively simple and yet highly effective for mounting dual land wheels for pivoting in a castering fashion in the transport position and up and down with respect to each other in the ground-working position. 9n

We claim:

1. In an earthworking implement having a frame and a plurality of earthworking tools depending from the frame, a ground wheel assembly for supporting the frame and for raising and lowering the frame between operating and transport positions comprising:

an arm having first and second ends, and connected at the first end to the frame and vertically positionable with respect thereto between first and second positions corresponding to the operating and transport positions, respectively, an axle member pivotally mounted on the arm at a second end thereof and rockable about an axis, a pair of ground-engaging wheels carried by the axle member on opposite sides of the axis, the axis shifting as the arm changes positions whereby in the first position the axle member rocks to provide relative vertical movement of the wheels with respect to each other and in the second position the axle member rocks to provide castering of the wheels during turns, and means for moving the arm between the first and second positions.

2. The invention defined in claim 1 wherein said pivotal axis has a substantial vertical component when the arm is in the transport position and a substantial horizontal component when the arm is in the plowing position.

3. The invention defined in claim 1 further including means for limiting the amount of rocking of the ground wheels.

4. A ground wheel assembly for supporting a plow bottom carrying plow frame, the ground wheel assembly comprising:

a ground wheel arm pivotally mounted on the frame and vertically movable with respect thereto;

a dual wheel axle member pivotally connected to the wheel arm and rockable about a shiftable pivotal axis, and a pair of ground-engaging wheels supported on the wheel axle; and means connected between the frame and the wheel arm for rocking the arm between raised and lowered positions corresponding to working and transport positions, respectively, of the plow frame and for shifting the pivotal axis between first generally horizontal and second generally vertical positions as the wheel arm is rocked between the working and transport positions such that when the arm is in the raised position, the axle member is rockable about the first pivotal axis position to provide for relative vertical movement of the ground-engaging wheels, and when the arm is in the lowered position, the axle member is rockable about the second pivotal axis position to provide for turning of the wheels from side to side.

5. In a plow having a main frame carrying a plurality of earthworking tools and a rear furrow wheel assembly connected to the wheel frame, a land wheel assembly comprising:

an arm member connected at its upper end to the frame and vertically positionable with respect thereto between raised and lowered positions corresponding to working and transport positions, respectively, of the plow;

a bracket connected to the lower end of the arm;

an axle member pivotally supported by the bracket and rockable about an axis lying generally in a fore-and-aft vertical plane passing through the bracket and having a substantial horizontal component when the arm member is in the raised position and a substantial vertical component when the arm member is in the lower position; and a pair of ground-engaging wheels mounted on the axle member on opposite sides of the bracket, and wherein when the arm is in the lower position the wheels rock in a castering fashion and when the arm is in the raised position the wheels rock up and down.

6. In a towed implement having a frame supporting a plurality of earthworking tools, a wheel assembly comprising:

a wheel support arm having upper and lower ends and connected at the upper end to the frame and having an upper and a lower position for supporting the frame in a working and a transport position, respectively; and a transverse axle member supported near the lower end of the arm and rockable with respect thereto about an axis, the axis inclined toward a horizontal position when the arm is in the upper position and toward a vertical position when the arm is in the lower position, said axis lying in a generally vertically extending plane passing through the wheel support arm, and two wheels mounted on the axle member on laterally opposite sides of the vertically extending plane and rockable with the axle member about the axis whereby when the arm is in the lower position the wheels rock in a castering fashion and when the arm is in the raised position the wheels rock up and down.

7. The invention defined in claim 6 wherein the axis is substantially parallel to the arm, the arm having a substantially horizontal attitude when in the upper position and a substantially vertical attitude when in the lower position.

8. In a plow adapted for movement forwardly over the ground and having a frame with a plurality of plow bottoms depending thereform, a ground wheel assembly comprising:

an arm having upper and lower ends and rockably at its upper end to the frame for movement about a horizontal pivot so that the lower end is movable up and down with respect to the frame and an axle support including a wheel axle connected at the lower end of the arm to rock about a pivot whose axis is inclined downwardly and forwardly and is movable with respect to the frame as the lower end of the arm moves up and down, the axis having a major vertical component when the arm is down and a major horizontal component when the arm is up, and at least two ground wheels carried by the axle support to rock therewith, the wheels rockable substantially in a castering fashion when lower end of the arm is down, and up and down with respect to each other when lower end of the arm is up.

9. In a plow having a plow frame, a ground wheel assembly comprising:

a forwardly extending arm connected about a horizontal pivot to the frame for rocking in a generally fore-and-aft plane between an up and down position wherein in the up position the arm has a major horizontal component and in the down position has a major vertical component, and a dual wheel carrying axle member rockably connected to lower end of the arm about a pivotal axis, the axis generally parallel to the fore-and-aft plane and inclined downwardly and forwardly with respect to the arm so that when the arm is in the down position, the downward component is greater than the forward component and when the arm is in the up position, the forward component is greater than the downward component so that the axle member is rockable in a castering fashion when the arm is in the down position, and generaly up and down when the arm is in the up position.

10. The invention defined in claim 9 wherein the pivotal axis is inclined about ten degrees downwardly and forwardly from the axis of the arm, and the arm approaches a substantially horizontal attitude when in the up position.

11. In an implement having a tool-carrying frame, a ground wheel assembly comprising: a wheel arm pivotally connected near its upper end to the frame by a generally transverse horizontal pivot and rockable between a downwardly inclined attitude and a substantially horizontal attitude; a dual wheel-carrying axle member; an axle support extending radially from and rockably supporting the axle member; pivot means for connecting the axle member to the lower end of the wheel arm, the pivot means having a pivotal axis inclined downwardly with respect to the wheel arm so that the wheels are rockable vertically about the pivot means when the arm is in its substantial horizontal attitude and are rockable in a castering fashion about the pivot means when the arm is in its inclined attitude; and power means connected between the frame and the wheel arm for rocking the latter about its pivot between the inclined and the substantially horizontal attitudes.

12. The invention defined in claim 11 wherein the pivot means includes means to limit the amount of rocking of the wheels when the arm is in the substantial horizontal position and the amount of caster when the arm is in the inclined attitude.

13. The invention defined in claim 11 wherein when the arm is in the downwardly inclined attitude the wheels may rock vertically with respect to each other a limited amount less than the amount they may rock when the arm is in the substantial horizontal attitude.

* * * * *